US005227947A

United States Patent [19]

Kaczmarek et al.

[11] Patent Number: 5,227,947

[45] Date of Patent: Jul. 13, 1993

[54] ARRESTER ASSEMBLY WITH SEALED BACK-UP AIR GAP

[75] Inventors: Richard T. Kaczmarek, Chicago; Alexander G. Gilberts, Barrington, both of Ill.

[73] Assignee: Reliance Comm/Tec Corporation, Chicago, Ill.

[21] Appl. No.: 758,631

[22] Filed: Sep. 12, 1991

[51] Int. Cl.[5] .............. H02H 3/22

[52] U.S. Cl. .............. 361/119; 361/129; 337/29

[58] Field of Search .............. 361/119, 129, 120; 337/32, 28, 29, 31; 313/131 R, 14 L

[56] References Cited

U.S. PATENT DOCUMENTS 4,241,374 12/1980 Gilberts .............. 361/124

4,866,562 9/1989 Jones .............. 361/119

*Primary Examiner*—Todd E. DeBoer

*Attorney, Agent, or Firm*—Trexler, Bushnell, Giangiorgi & Blackstone, Ltd.

[57] ABSTRACT

An assembly for defining a sealed back-up air gap, for use with a line protector comprising an over-voltage arrester housed within a canister and defining a back-up air gap therebetween, comprises an electrical contact and a sealing member. A mounting arrangement is disposed on the electrical contact for positively positioning and retaining the sealing member on the electrical contact. The sealing member is engagable with the canister to form a seal for the back-up air gap, and with the contact while also mounting the contact for electrically conductive engagement with one electrode of the arrester. In one embodiment, the sealing member is an elastomeric O-ring. In another embodiment, the O-ring mount is formed by deformation of the electrical contact. In yet another embodiment, the O-ring is replaced by a flat, annular washer-shaped insulator, which is positively retained on the electrical contact.

14 Claims, 2 Drawing Sheets

ARRESTER ASSEMBLY WITH SEALED BACK-UP AIR GAP

BACKGROUND OF THE INVENTION

The present invention relates generally to an improved surge arrester assembly having a sealed back-up air gap. More specifically, the invention relates to a novel contact for use with an over-voltage arrester, and an arrangement for sealing the contact with a canister, which also receives the arrester.

Given the current and voltage sensitivity, and the high cost of most modern electric and electronic equipment, users of that equipment often employ line surge protectors connected electrically in-line with the equipment. These line protectors prohibit the flow of current in the presence of a voltage surge having a magnitude greater than the tolerance of the equipment. To this end, many of these line protectors contain voltage arrester assemblies means in the form of a surge voltage or over-voltage arrester, which shunts the line to ground in the presence of a voltage greater than that tolerable by the equipment. The construction and operation of protectors employing surge voltage arresters is well known in the relevant art, as is evident, for example, from the patent of Gilberts, U.S. Pat. No. 4,241,374, assigned to the assignee of the present invention. The disclosure of that patent is incorporated herein by this reference.

Over-voltage arresters usually comprise a pair of spaced electrodes defining therebetween a spark gap which may be surrounded by air (as in a so-called carbon arrester) or by an appropriate, usually inert, gas (as in a so-called gas tube arrester). If an over-voltage (i.e. voltage exceeding the equipment tolerances) is present in the line to the equipment, that over-voltage will cause an arc across the spark gap continue to ground. This prevents the over-voltage condition damaging the equipment. The above-referenced Gilberts patent utilizes a gas tube arrester.

To prevent an over-current condition from damaging the equipment, a solder pellet is usually included in the protector, as part of the arrester assembly. When an over-current is present, the heat generated thereby melts the pellet. With the pellet melted, the arrangement is such that an electrical connection is made between the line and ground, again preventing damage to the equipment. One such arrangement is shown and described in the above-referenced Gilberts patent.

As shown in the referenced Gilberts patent, a secondary or back-up spark gap is defined between one electrode of the gas tube and a canister housing the arrester. To seal this back-up spark gap, a potted 0-ring is used. The O-ring is placed between the canister and an electrical contact, which forms the connection to ground, and a quantity of a potting compound is added above the O-ring.

While this type of seal works well in some employments, there is room for further improvements. The sealed back-up air gap construction of the present invention is intended to provide such an improvement.

OBJECTS AND SUMMARY OF THE INVENTION

A general object of the invention is to provide an improved construction of a line protector for use in various electric and electronic applications.

A more specific object of the present invention is to provide a new and unique construction for a sealed back-up air gap arrangement for use with a surge voltage arrester in a line protector assembly.

Another object of the invention is to provide a uniquely constructed contact for such a sealed back-up air gap arrangement.

A related object of the invention is to provide a uniquely constructed contact which facilitates sealing of such a sealed back-up air gap arrangement more effectively than other, currently available arrangements.

An assembly for defining a sealed back-up air gap, constructed according to the teachings of the present invention, for use with a line protector comprising an over-voltage arrester housed within a canister and defining a back-up air gap therebetween, comprises an electrical contact and a sealing member. A mounting arrangement is disposed on the electrical contact for positively positioning and retaining the sealing member on the electrical contact. The sealing member is engagable with the canister to form a seal for the back-up air gap, and with the contact while also mounting the contact for electrically conductive engagement with one electrode of the arrestor. In one embodiment, the sealing member is an elastomeric O-ring. In another embodiment, the O-ring mount is formed by deformation of the electrical contact. In yet another embodiment, the O-ring is replaced by a flat, annular washer-shaped insulator, which is positively retained on the electrical contact.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENTS

Figure 1:
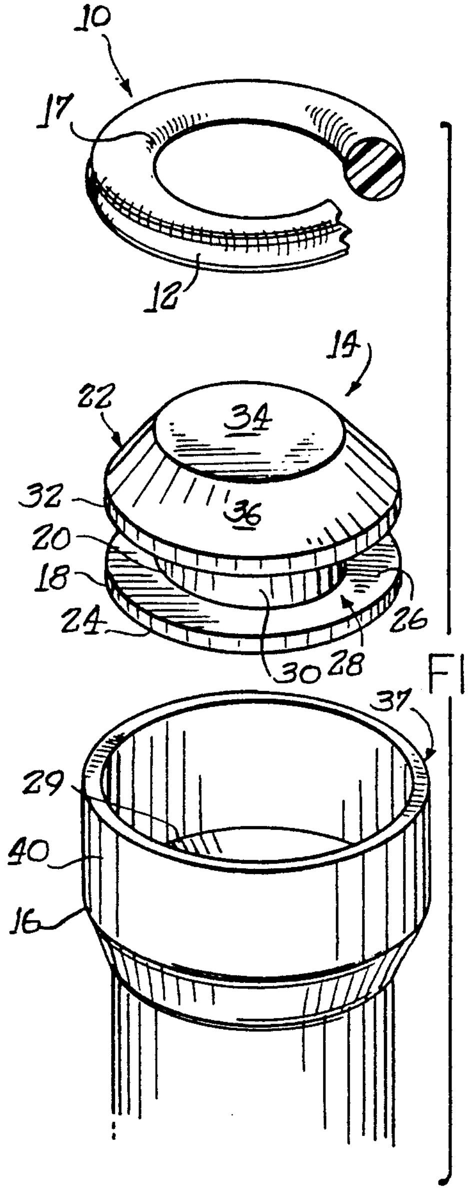
FIG. 1 is an exploded perspective view of a sealed back-up air gap device, constructed according to the teachings of the present invention, showing the uniquely constructed elements thereof.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
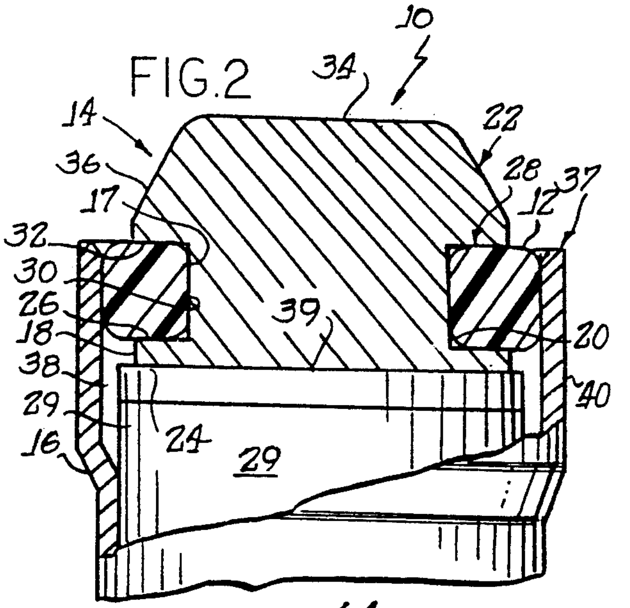
FIG. 2 is a sectional assembled view of the sealed back-up air gap device illustrated in FIG. 1.

Referring initially to FIG. 2, one embodiment of an assembly 10 for defining sealed back-up air gap, constructed according to the teachings of the present invention, is illustrated. As shown in FIG. 1, the air gap 10 essentially comprises a sealing member, which in the form shown in FIG. 1 is an O-ring 12, and an electrical contact 14. A canister 16 forms part of an over-voltage arrester assembly, in which a secondary or back-up air gap 38 (See FIG. 2) is provided. The present invention provides a seal for this air gap 38.

The O-ring 12 is composed of an elastomeric material, such as rubber and the like, having sufficient resiliency so that, upon compression between the contact 14 and the canister 16, it will form a tight seal. The O-ring 12 is substantially toroidal in shape, possessing a substantially circular cross section taken perpendicularly to an inner diameter 17 of the O-ring 12. However, the cross section of the O-ring 12 deforms to conform generally to the space between the contact 14 and the canister 16 when the assembly 10 is completed, as shown in FIG. 2, and as more fully described hereinbelow.

The electrical contact 14 is composed of an electrically conducting material, such as a metal and the like. The contact 14 has a unique configuration. The contact 14 comprises a base portion 18, a head portion 22, and a decreased diameter connecting portion 20. The connecting portion 20 extends between the base portion 18 and the head portion 22, thereby connecting the base portion 18 to the head portion 22.

The base portion 18 is substantially flat and circular, having a first side or surface 24 and an oppositely facing second side or surface 26. The peripheral configuration of the base portion 18 is constructed so as to be insertable into the canister 16. Thus, the canister 16 cross sectional configuration is circular. The first surface 24 is constructed to make electrical contact with one electrode 39 of a gas tube 29 (See FIG. 2) of the type disclosed in the above-referenced United States Patent to Gilberts. The second surface 26 is substantially flat and circular, and forms part of an O-ring mounting means or structure 28, as will be discussed herein.

The connecting portion 20 projects from the base portion 18 on the second side or surface 26 thereof, and projects upwardly substantially perpendicularly away from the base portion 18. The connecting portion 20 is substantially cylindrical in shape, having a diameter 30 at least as great as, and preferably similar to the inner diameter 17 of the O-ring 12. In this manner, the O-ring 12 can be mounted about the connecting portion 20. The connecting portion 20 is joined to the head portion 22 at an end opposite to the end of the connecting portion 20 joined to the base portion 18, and is substantially perpendicular to the head portion 22.

The head portion 22 has a bottom side or surface 32 and a top side or surface 34 joined by a substantially sloping portion 36. The head portion 22 is joined to the connecting portion 20 at the bottom surface 32. The connecting portion 20 is preferably substantially centered with respect to surfaces 26 and 32. The top surface 34 is substantially planar, and is substantially parallel to the bottom surface 32. The diameters of surfaces 26 and 32 are preferably substantially similar to each other and each is substantially greater than the inner diameter of the O-ring 12.

The top surface 34 has a diameter somewhat smaller than a diameter of the bottom surface 32. Accordingly, the sloping portion 36 inclines inwardly from the bottom surface 32 to the top surface 34. The sloping portion 36 thusly has a frusto-conical surface. The sloping portion 36 is substantially smooth to allow for the sliding passage of the O-ring 12 over it towards the O-ring mounting means or structure 28.

It will be appreciated that the second surface 26 of the base portion 18, the connecting portion 20, and the bottom surface 32 of the head portion 22 collectively define the O-ring mounting means 28, which is capable of firmly positively retaining the O-ring 12 therein. To construct the air gap 10, the O-ring 12 is placed upon the sloping portion 36 of the head portion 22. A downwardly directed force is applied to the O-ring 12 so that the O-ring 12 is encouraged to slide along the sloping portion 36.

The inner diameter 17 of the O-ring 12 expands to allow the passage of the sloping portion 36 therethrough. The force application continues until the O-ring 12 passes over the sloping portion 36 and into the O-ring mounting means 28. When the O-ring 12 reaches this point, the resiliency of the O-ring 12 causes it to snap into place, covering the connecting portion 20.

As the O-ring 12 settles into proper positioning on the O-ring mounting means 28, the inner diameter 17 returns towards its at rest configuration. The inner diameter 17 may constrict or squeeze somewhat around the diameter 30 of the connecting portion 20. As shown in FIG. 2, the O-ring 12 is now bounded and trapped on three sides by the contact 14. Specifically, the O-ring is trapped on three sides by the second surface 26 of the base portion 18, the outer surface of the connecting portion 20, and the bottom surface 32 of the head portion 22, respectively, which collectively define the mounting means 28.

Now, the assembly 10 may be inserted into the canister 16 on top of the previously introduced arrester 29 (preferably of the gas-tube type). The canister 16 has an enlarged diameter portion 37 of sufficient size and of appropriate configuration to accept the assembly 10. As the assembly 10 is inserted, the O-ring 12 is trapped on its fourth side by a wall 40 of the enlarged diameter portion 37 of the canister 16. The assembly 10 is inserted until the surface 24 abuts a top surface of an electrode 39 of the gas tube 29, at which time the entire fourth side of the O-ring 12 is trapped and compressed by the wall 40. In this regard, the inner diameter of portion 37 (wall 40) is less than the outer diameter of the O-ring 12. It will also be noted that the back-up air gap 38 is defined between an inner surface of wall 40 and a facing outer lateral surface of electrode 39.

As illustrated in FIG. 2, when the O-ring 12 is trapped by the second surface 26, the connecting portion 20, the bottom surface 32, and the inner surface of wall 40, the O-ring 12 is deformed to completely seal the back-up air gap 38. The cross section of the O-ring 12 deforms or changes from being substantially circular to being substantially polygonal, or generally rectangularly shaped, as shown in FIG. 2. The assembly 10 thus performs its sealing function so well that additional sealants, such as a potting compound, or the like, need not be used. The top surface 34 of the contact 14 thus projects outwardly of the sealed arrester assembly thus formed to make electrical contact between the gas tube electrode 39 and the line to be protected.

Figure 3:
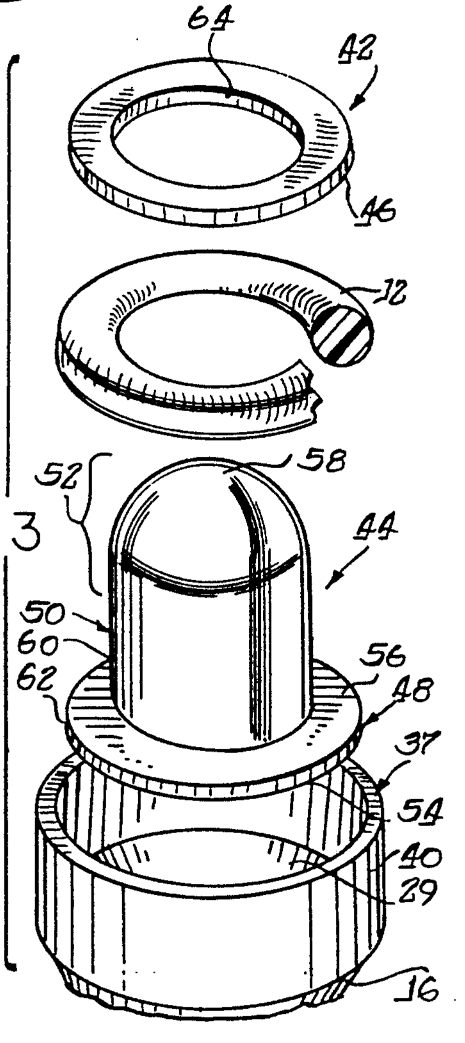
FIG. 3 is an exploded perspective view of another embodiment of a sealed back-up air gap device, also constructed according to the teachings of the present invention, showing the elements thereof.
Figure 4:
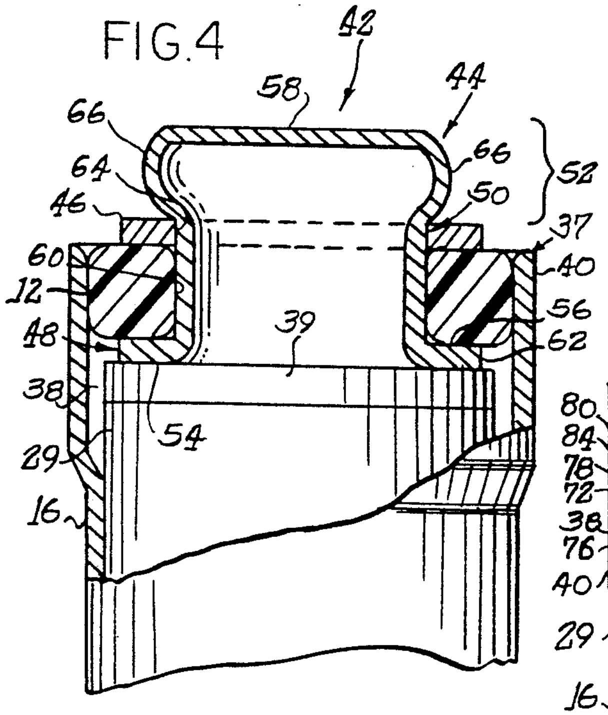
FIG. 4 is a sectional assembled view of the air gap device depicted in FIG. 3.

Referring to FIGS. 3 and 4, another embodiment of the present invention is shown. An assembly 42 for sealing a back-up air gap functions substantially similarly to the assembly 10 shown in FIG. 2. Also, the elements of the two assemblies 10 and 42 are similar in many respects, except for the differences to be noted hereinbelow.

As shown in FIG. 3, the assembly 42 is comprised of an electrical contact 44, an O-ring 12, and O-ring compressing means in the form of a washer 46. The contact 44 is constructed differently from the contact 14 described hereinabove. Specifically, the contact 44 comprises a deformable body 50 having a flared out, generally annular base 48. Preferably, the body 50 is formed from a sheet metal material, and is therefore hollow. This permits body 50, and in particular a portion 52 thereof to be deformed as described hereinbelow.

The base 48 has a first surface 54 and an oppositely facing second surface 56. The first surface 54 is constructed to electrically contact electrode 39 of gas tube 29. The body 50 is substantially centered on the second surface 56, and extends substantially perpendicularly away from the base 48.

The body 50 is substantially cylindrical in shape, but has a rounded end 58 opposite to the end thereof defining the base 48. The body 50 has a diameter 60 at least as great as and preferably substantially equal to the diameter 17 of the O-ring 12. In this way, the body 50 can be inserted into the O-ring 12. However, the base 48 has an outer diameter 62 which is substantially greater than the diameter 17 of the O-ring 12. Thus, the O-ring 12 does not pass over the base 48, but is received, and supported thereby.

The washer 46 is of flat, annular construction, and also has an inner diameter 64 substantially equal to the outer diameter of the body 50. Thus, the body 50 can also be inserted into the washer 46. The deformable portion 52 is disposed on the body 50 between the base 48 and the rounded end 58. The deformable portion 52 is offset upwardly from the base 48 a certain distance defined generally by the combined thickness of the O-ring 12 and the washer 46.

The assembly 42 is assembled similarly to the assembly 10. Specifically, the first surface 54 of the base 48 is placed on a firm, flat surface, or in a suitable tool. Then, the O-ring 12 is placed over the enlarged body 50 so that the O-ring 12 engages the second surface 56 of the base 48. The washer 46 is also placed over the body 50 so that the washer 46 engages the O-ring 12 on a side thereof opposite to the side engaging the second surface 56.

A force is then applied to the rounded end 58 by a suitable tool. The force causes the deformable portion 52 to deform and to flatten somewhat, as shown in FIG. 4. The deformation of the portion 52 causes the effective outer diameter of the body 50 to increase at the deformable portion 52 to form an annular ridge or projection 66. Thus, the O-ring 12 and the washer 46 are held captive on the body 50 by the projection 66. Preferably, a flat surface 58 is formed at the top of body 50 to electrically contact a line circuit, and complete the circuit from electrode 39 of arrestor 29 to the line to be protected.

The assembly 42 is inserted into the canister 16 in the same manner, above disclosed with respect to assembly 10. However, in this case, the O-ring 12 is trapped on three sides by the second surface 56 of the base 48, the outer surface 60 of the body 50, and the washer 46, respectively. The O-ring 12 is trapped on its fourth side by the wall 40 of the canister 16. Again, the O-ring 12 is trapped on all sides to such a degree as to eliminate the need for a potting compound, sealant or the like, in much the same fashion as described above with reference to FIG. 2.

Figure 5:
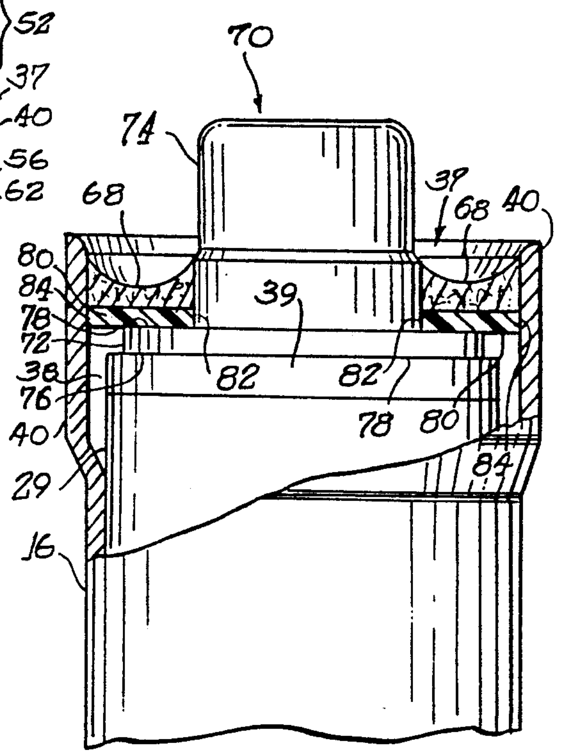
FIG. 5 is a sectional assembled view of another embodiment of an air gap device of the present invention.
Figure 6:
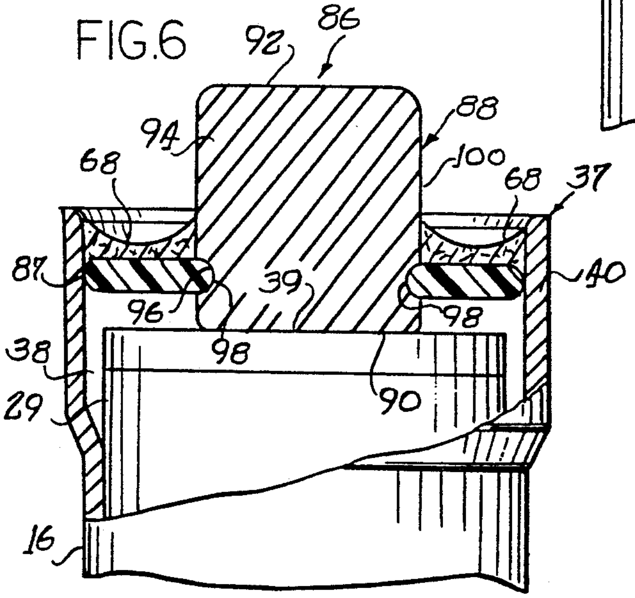
FIG. 6 is a sectional assembled view of yet another embodiment of an air gap device constructed according to the teachings of this invention.

Two additional embodiments of the present invention are illustrated in FIG. 5 and FIG. 6. A potting compound 68 can be used with both of these embodiments to further enhance the seal formed thereby.

The particular assembly 70 of FIG. 5 is similar in many respects to the above-disclosed embodiments except for the differences to be noted hereinbelow. The assembly 70 comprises a generally circular base 72 and an elongated reduced diameter body 74. The base 72 has a first surface 76 and a second surface 78 facing oppositely to each other. The first surface 76 is substantially similar in configuration and function to the above-discussed surfaces 24 and 54. The second surface 78 supports a substantially flat, annular or washer-shaped insulator 80.

The insulator 80 is composed of an insulating material, such as plastic, and the like, and takes the place of the O-ring 12. The insulator 80 has an inner diameter such that the elongated body 74 can be inserted therethrough, and such that an inner surface 82 of the insulator 80 confronts and sealingly engages the elongated body 74. The insulator 80 also has an outer diameter 84 which is dimensioned such that the outer periphery 84 of the insulator 80 can confront and engage the wall 40 of the canister 16, thereby sealing it.

When the assembly 70 is inserted into the canister 16, an outer surface 84 of the insulator 80 confronts and engages the wall 40. In order to further enhance the seal formed by the insulator 80 relative to the canister 16 and to the body 74, a potting compound 68 is placed over the entirety of the insulator 80 on a side thereof opposite to the side engaged by the base 72. An amount of potting compound 68 is added so that the compound 68 contacts not only the insulator 80, but also the elongated body 74 and the inside surface of the wall 40 of the canister 16, thereby forming an even stronger seal.

In the assembly 86 illustrated in FIG. 6, the overall construction thereof is substantially similar to that of the member 70 shown in FIG. 5. Here, however, certain details of the structure of the insulator 87 and the contact 88 are different.

Specifically, the contact 88 is substantially cylindrical in shape, and lacks the base construction of the previously described embodiment. The contact 88 has a bottom 90 and a top 92 connected by a cylindrical portion 94. The bottom 90 of the contact 88 is constructed so as to contact the gas tube 29 directly.

The cylindrical portion 94 has an annular recess or groove 96 disposed in proximity to the bottom 90. The groove 96 is constructed so as to accept and firmly retain the insulator 87. Thus, the groove 96 defines a diameter substantially equal to the inner diameter of the insulator 87. However, the rest of the cylindrical portion 94 has a diameter 100 which is somewhat larger than the inner diameter 98 of the insulator 87. It will be noted that both the groove 96 and an inside surface 98 of the insulator 87 are radiused or rounded.

With this construction, the insulator 87 is forced slidably over the cylindrical portion 94 until it slides or snaps into the groove 96. The groove 96 is thusly able to positively retain the insulator 87 on the electrical contact 88. The insertion of the assembly 86 into the canister 16 is substantially similar to that of the last-described embodiment, as is the utilization and disposition of the potting compound 68. All of the above-described embodiments of the present invention provide significant improvements over the air gap constructions of the prior art.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An assembly for defining a sealed back-up air gap for an over-voltage arrester construction of the type including a canister and an over-voltage arrester housed within the canister and a back-up air gap defined between the arrester and the canister; said assembly comprising: an electrical contact member and a sealing member; mounting means including means disposed on the electrical contact member for positively positioning and retaining the sealing member in a sealed condition on the electrical contact member; and the sealing member being engagable with a canister to form a seal and for positioning the contact member for sealed, electrically conductive engagement with one electrode of an arrester and with a portion of the contact member projecting outwardly of the seal to form one electrode of an arrester construction, thereby defining a sealed, back-up air gap for an arrester within a canister wherein the sealing member comprises an elastomeric O-ring which is trapped on three sides thereof by the mounting means when placed thereabout, with a fourth side of the O-ring being trapped by a wall of a canister upon insertion of the electrical contact into a canister.

2. An assembly as defined in claim 1 wherein the electrical contact comprises a base portion having a generally circular surface, and a head portion having a generally circular surface spaced apart from and facing that of the base portion, and a reduced diameter connecting portion joining the base portion to the head portion at their respective facing surfaces such that the mounting means is formed by the facing surfaces and the connecting portion.

3. An assembly as defined in claim 2 wherein the facing surfaces of the base portion and the head portion, and the connecting portion trap the O-ring on three sides thereof.

4. An assembly as defined in claim 2 wherein the sealing member comprises an elastomeric O-ring and wherein the facing surfaces of the head portion and of the base portion have outer diameters substantially larger than an inner diameter of the O-ring, and the connecting portion has an outer diameter at least as great as the inner diameter of the O-ring.

5. An assembly as defined in claim 1 wherein the O-ring has a substantially circular latitudinal cross-section when undeformed, and has flattened edges, defining a substantially rectangular latitudinal cross-section when trapped by the mounting means and a wall of a canister.

6. An assembly as defined in claim 1 wherein said mounting means further comprises a generally flat, annular washer-like member, wherein the electrical contact comprises a generally circular base portion and a deformable portion projecting from and substantially centered on the base portion, and wherein said washer-like member is disposed on the deformable portion.

7. An assembly as defined in claim 6 wherein the mounting means is formed by deforming the deformable portion to form a projection having an enlarged diameter head portion spaced from the base portion and impinging upon the washer-like member and a shaft portion joining the head portion and the base portion such that the washer-like member, the shaft portion, and the base portion define the mounting means.

8. An assembly as defined in claim 6 wherein the deformable portion terminates at a rounded end, the rounded end being disposed on an end of the deformable portion opposite to the base portion, and the rounded end facilitating the deformation of the deformable portion.

9. An assembly for defining a sealed back-up air gap for an over-voltage arrester construction including a canister, an over-voltage arrester housed within the canister, and a back-up air gap defined between the arrester and the canister, said assembly comprising: an electrical contact and a flat, annular washer-shaped insulator; the electrical contact comprising a generally circular base and an elongated, decreased diameter body projecting from the base; the insulator having an inner diameter substantially equal to an outer diameter of the elongated body; the elongated body being insertable through the insulator; the base having an outer diameter greater than the inner diameter of the insulator for positively regaining and supporting the insulator; the insulator being engagable with a canister, and a quantity of potting compound disposed over the insulator on a side thereof opposite to the side supported by the base to form a seal and for positioning the contact member for sealed, electrically conductive engagement with one electrode of an arrester, and with a portion of the contact member projecting outwardly of the seal to form one electrode of an arrester construction, thereby defining a sealed, back-up air gap for an arrester within a canister.

10. An assembly as defined in claim 9 wherein the insulator is composed of a plastic material.

11. An assembly for defining a sealed back-up air gap for an over-voltage arrester construction including a canister, an over-voltage arrester housed within the canister, and a back-up air gap defined between the arrester and the canister, said assembly comprising: an electrical contact and a flat, annular washer-shaped insulator; the electrical contact having an outer diameter greater than an inner diameter of the insulator; an annular groove disposed on the contact for accepting the insulator; and the groove defining an outer diameter substantially equal to the inner diameter of the insulator for positively retaining the insulator about the groove; and the insulator being engagable with a canister to form a seal and for positioning the contact member for sealed, electrically conductive engagement with one electrode of an arrester and with a portion of the contact member projecting outwardly of the seal to form one electrode of an arrester construction, thereby defining a sealed, back-up air gap for an arrester with a canister.

12. An assembly as defined in claim 11 wherein the insulator is composed of plastic.

13. An assembly as defined in claim 11 further comprising a quantity of potting compound disposed over the insulator after insertion of the contact into a canister.

14. An assembly as defined in claim 11 wherein the contact is substantially cylindrical in shape.

* * * * *